United States Patent [19]
Castelnuovo et al.

[11] 3,919,353

[45] Nov. 11, 1975

[54] IMPACT RESISTANT POLYESTERS COMPRISING A CROSSLINKED RUBBERY POLYMER

[75] Inventors: Lucio Castelnuovo; Andrea Mattiussi, both of Milan, Italy

[73] Assignee: Montecatini Edison S.p.A., Milan, Italy

[22] Filed: Oct. 2, 1973

[21] Appl. No.: 402,737

[52] U.S. Cl. .................................................. 260/873
[51] Int. Cl.[2] ............................................. C08G 39/10
[58] Field of Search ........................... 260/873, 75 T

[56] References Cited
UNITED STATES PATENTS 3,345,434   9/1967   Griffith ........................... 260/873 X
3,723,574   3/1973   Brinkmann et al. ................ 260/873

*Primary Examiner*—Melvin Goldstein
*Assistant Examiner*—T. Pertilla

[57] ABSTRACT

Molding compositions based on saturated linear polyesters of aliphatic or aromatic dicarboxylic acids and aliphatic or cycloaliphatic diols and having dispersed therein, for increasing the impact resistance of and resilience of the polyester, a polymer having a second order transition temperature lower than 0°C and which, in a preferred embodiment, is grafted with polymeric chains of polar and/or polarizable monomers or contains, in its chain, monomers containing polar and/or polarizable groups, such as, e.g., a copolymer and butadiene and styrene cross-linked and grafted with styrene and methyl methacrylate.

1 Claim, No Drawings

IMPACT RESISTANT POLYESTERS COMPRISING A CROSSLINKED RUBBERY POLYMER

Polyethylene terephthalate has been used extensively for the preparation of fibers and films because of its valuable chemical and mechanical properties, hardness, abrasion resistance and good electrical characteristics.

In contrast, articles of polyethylene terephthalate obtained by injection molding are defective because of their low impact resistance.

As is known, some improvement in the dimensional stability of articles based on the polyester is obtained by incorporating in the polyester up to 10% by weight of a polyolefin such as polypropylene, poly-4-methylpolypentene, polyethylene, and rubbery terpolymers of ethylene, propylene and a diene. The incorporation of such modifiers in the polyesters does improve the stability of articles formed from the mixture, in particular the stability of articles subjected to thermal treatment at temperatures around 100°C, even if the polyester has a low degree of crystallinity.

On the contrary, the impact resistance (Izod resilience with notch) of articles formed from polyethylene terephthalate is not substantially improved, and is even decreased, when a polyolefin of the type aforesaid is mixed with the polyester, in comparison with the impact resistance of articles formed from polyethylene terephthalate per se, although some improvement in the results obtained by the Ball-drop test may be observed when the polyester is mixed with from 10 to 30% by weight of polyethylene, preferably of the low density type.

It has been suggested to improve the dispersibility of the modifiers in polyethylene terephthalate by including in the mixes copolymers of ethylene with acrylic or methacrylic acids or esters, copolymers of ethylene with vinyl esters, or polymers obtained by grafting styrene on polybutadiene or on copolymers of butadiene and styrene. However, the articles obtained from those mixes do not have sufficient resilience for practical purposes.

Moreover, the last-mentioned modifiers are difficult to disperse in the polyesters and, even with vigorous stirring during the mixing stage, the results are generally unsatisfactory. Actually, the molded articles obtained appear to be non-homogeneous and to have non-uniform characteristics.

It is known, moreover, that the dispersion of the modifier in an impact resistant mix is a determining factor in regard to its resilience characteristics. The size of the modifier particles and their distribution must be at an optimum level which is extremely difficult to obtain and above all to reproduce, when mixing two thermoplastic polymers according to conventional techniques.

The main object of this invention is to provide particular types of compositions based on saturated linear polyesters, which do not show the aforementioned drawbacks of the prior art products.

Another object is to provide a process for preparing the new molding compositions by which substantially homogeneous molded articles having uniformly improved properties are obtained.

These and other objects which will appear hereinafter are achieved by the invention according to which there are provided molding compositions having high impact resistance and good dimensional stability and comprising A. a matrix of a linear polyester of an aromatic dicarboxylic acid, optionally in admixture with small quantities of aliphatic dicarboxylic acid, and a saturated aliphatic or cycloaliphatic diol, said polyester having an intrinsic viscosity of at least 0.65 dl/g;

B. a dispersed polymeric phase consisting of a polymer having a second order transition temperature lower than 0°C and further characterized in being crosslinked and preferably grafted with polymeric chains of polar and/or polarizable monomers or containing in the chain monomers having polar and/or polarizable groups.

Examples of polymers which can be used for preparing said dispersed phase employed in the compositions according to this invention are polybutadiene, butadiene-styrene, or butadiene-acrylonitrile copolymers, ethylene-propylene rubbers, polyisobutene, polyisoprene, and polyethylene. The polar monomers which may be used as grafting agents or which may be a part of the polymer chain of the dispersed phase are e.g., the acrylic or methacrylic esters of saturated aliphatic alcohols, vinyl acetate, acrylonitrile; examples of polarizable monomers are styrene or substituted styrenes (alkyl styrenes).

In the cross-linked and grafted polymers used for preparing the compositions according to this invention, the cross-linked phase is preferably present in a quantity exceeding 30% and more particularly comprised between 50 and 100% by weight.

The quantity of cross-linked polymer as defined above, present in the polyester, is comprised between 3 and 30%, preferably between 10 and 25% of the total weight of the mixture. The presently preferred cross-linked and grafted polymers are polybutadiene (or butadiene/styrene copolymers) cross-linked and grafted with copolymers of styrene and methyl methacrylate.

Examples of saturated polyesters which may be used in the practice of this invention are polybutene terephthalate, polycyclohexene terephthalate and, preferably, polyethylene terephthalate.

The intrinsic viscosity of the polyesters employed, expressed in dl/g, measured on solutions in phenol/tetrachloroethane (ratio by weight 50:50) at 25°C is comprised between 0.65 and 1.5, preferably between 0.8 and 1.30.

The polyester may contain organic and inorganic nucleating agents, like montan wax partly salified with Na ions, talcum, calcium carbonate or aluminum silicate which, by accelerating the polymer crystallization rate, increase the degree of crystallinity of the impact-resistant material, conferring to it a greater dimensional stability and improved mechanical characteristics.

The compositions according to this invention may be prepared by mixing the components according to conventional techniques.

The cross-linked and grafted polymers used in this invention are prepared according to known methods by subjecting the linear polymers to a grafting reaction through the action of peroxides or other substances having a radicalic action.

According to other methods, the grafting may be effected on a latex of the already cross-linked polymer.

The particle size in the manufactured article is comprised between 0.02 and 2 micron, preferably between 0.2 and 1 micron.

The cross-linked and grafted polymers used in the working examples are indicated in Table I, which shows for each of them the second order transition temperature and the percentage of cross-linked phase.

EXAMPLES OF IMPACT-MODIFIERS

| Impact-modifier | N° | Type | Glass trans. temp. (Tg) °C | % cross-linked phase | Manufacturer |
| --- | --- | --- | --- | --- | --- |
| Kane Ace B28 | I | MBS* | −60 | 90 | Kanegafuchi Chem. Ind. |
| Kane Ace B22 | II | | −55 | 90 | Kanegafuchi Chem. Ind. |
| Paraloid KM611 | III | MBS* | −65 | 88 | Rohm & Haas |
| Kureha BTA 3°N | IV | MBS* | −52 | 100 | Kureha Chem. Ind. |
| Paraloid KM228 | V | MBS* | −50 | 50 | Rohm & Haas |

*Polybutadiene (or butadiene/styrene copolymer) cross-linked and grafted with styrene and methyl methacrylate.

In the following examples, which are given to illustrate the various aspects of this invention and are not intended to be limiting, the particle size of the polyester used is lower than 300 micron. It has been ascertained, however, that the use of the polyester in the form of granules does not result in deterioration of the properties of the mix.

EXAMPLE 1

1,000 parts of polyethylene terephthalate in powder form (particle size lower than 300 micron) with an intrinsic viscosity = 1.20 were dried under vacuum at 140°C for 24 hours and then mixed in a rotating mixer for 20 minutes with 100 parts of impact-modifier I dried under vacuum at 40°C for 4 hours.

The mixture was then granulated in an extruder in an atmosphere of dry nitrogen and at a temperature not in excess of 280°C; the rotation rate of the screw was the highest possible one (about 100 r.p.m.) in order to achieve the best mixing and homogenizing conditions and to abbreviate the residence time in the apparatus at high temperatures.

The granules, dried at 140°C under vacuum for 24 hours were subsequently molded by injection (in a dry nitrogen atmosphere) into small bars of 64 × 12 × 3 mm. The main molding conditions were:

| | |
| --- | --- |
| Temperature of molten mass | 296°C |
| Speed of screw | 140 r.p.m. |
| Injection speed | 5.5 mm/sec. |
| Temperature of mold | about 30°C |
| Cooling time | 30 sec. |

The Izod resilience measured according to the ASTM D 256 method was (the average value of 20 samples) 8 kgcm/cm. The intrinsic viscosity of the article appeared to be = 0.83 dl/g. On small bars made out of the same polyethylene terephthalate prepared in the same way but without the addition of the impact-modifier, an Izod resilience (average of 20 samples) of 3.8 kgcm/cm was determined.

EXAMPLE 2

A mix of 1,000 parts of polyethylene terephthalate according to example 1 and 200 parts of impact-modifier I was prepared according to the modalities described in example 1.

On the small molded bars an Izod resilience of 36.9 kgcm/cm was determined.

EXAMPLE 3

A mix consisting of 1,000 parts of polyethylene terephthalate according to example 1 and 300 parts of impact-modifier I was prepared according to the modalities described in example 1. On the small molded bars, an Izod resilience (average of 20 samples) of 105 kgcm/cm was determined.

EXAMPLE 4

A mix consisting of 1,000 parts of polyethylene terephthalate according to example 1 and 100 parts of impact-modifier II was prepared according to the modalities described in example 1. On the small molded bars, an Izod resilience of 7.11 kgcm/cm was determined.

EXAMPLE 5

A mix consisting of 1,000 parts of polyethylene terephthalate according to example 1 and 200 parts of impact-modifier II was prepared according to the modalities described in example 1. On the small molded bars, an Izod resilience of 11.26 kgcm/cm was determined.

EXAMPLE 6

A mix of 1,000 parts of polyethylene terephthalate according to example 1 and 100 parts of impact-modifier III was prepared according to the modalities described in example 1. On the small molded bars, an Izod resilience of 9.25 kgcm/cm was determined.

EXAMPLE 7

A mix of 1,000 parts of polyethylene terephthalate according to example 1 and 200 parts of impact-modifier III was prepared according to the modalities described in example 1. On the molded bars, an Izod resilience of 13.65 kgcm/cm was determined.

EXAMPLE 8

A mix of 1,000 parts of polyethylene terephthalate according to example 1 and 100 parts of impact-modifier IV was prepared according to the modalities described in example 1. On the small molded bars, an Izod resilience of 11.58 kgcm/cm was determined.

EXAMPLE 9

A mix of 1,000 parts of polyethylene terephthalate according to example 1 and 200 parts of impact-modifier IV was prepared according to the modalities described in example 1. The Izod resilience of the small molded bars was 107.2 kgcm/cm.

EXAMPLE 10

A mix of 1,000 parts of polyethylene terephthalate according to example 1 and 200 parts of impact-modifier V was prepared according to the modalities described in example 1. On the small molded bars, an Izod resilience of 5.57 kgcm/cm was determined.

EXAMPLE 11

A mix of 1,000 parts of polyethylene terephthalate having an intrinsic viscosity of 1.12 and containing 0.45% by weight of an inorganic nucleating agent (talcum) and 100 parts of impact-modifier I was prepared according to the modalities described in example 1, but keeping the mold at a temperature of 140° in order to obtain the maximum degree of crystallinity of the material.

On the small molded bars, an Izod resilience (average of 20 samples) of 8.47 kgcm/cm was determined; the intrinsic viscosity of the article appeared to be 0.896 dl/g.

On small bars of that same (nucleated) PET, prepared in the same way (mold at 140°C) but without the addition of the modifier, an Izod resilience (average of 20 samples) of 2.95 kgcm/cm was determined.

EXAMPLE 12

A mix of 1,000 parts of polyethylene terephthalate according to example 11 and 200 parts of impact-modifier I was prepared according to the modalities described in example 11. On the small molded bars, an Izod resilience of 11.7 kgcm/cm was determined.

EXAMPLE 13

A mix of 1,000 parts of polyethylene terephthalate according to example 11 and 300 parts of impact-modifier I was prepared according to the modalities described in example 11. On the small molded bars, an Izod resilience of 12.51 kgcm/cm was determined.

EXAMPLE 14

A mix of 1,000 parts of polyethylene terephthalate according to example 11 and 100 parts of impact-modifier II was prepared according to the modalities described in example 11. The Izod resilience of the small molded bars was 7.1 kgcm/cm.

EXAMPLE 15

A mix of 1,000 parts of polyethylene terephthalate according to example 11 and 200 parts of impact-modifier II was prepared according to the modalities described in example 11. On the small molded bars, an Izod resilience of 8.5 kgcm/cm was determined.

EXAMPLE 16

A mix of 1,000 parts of polyethylene terephthalate according to example 11 and 300 parts of impact-modifier II was prepared according to the modalities described in example 11. On the small molded bars, an Izod resilience of 9 kgcm/cm was determined.

EXAMPLE 17

A mix of 1,000 parts of polyethylene terephthalate according to example 11 and 100 parts of impact-modifier III was prepared according to the modalities described in example 11. The Izod resilience determined on the small molded bars was 8.75 kgcm/cm.

EXAMPLE 18

A mix of 1,000 parts of polyethylene terephthalate according to example 11 and 200 parts of impact-modifier III was prepared according to the modalities described in example 11. The Izod resilience determined on the small molded bars was 9.37 kgcm/cm.

EXAMPLE 19

A mix of 1,000 parts of polyethylene terephthalate according to example 11 and 100 parts of impact-modifier IV was prepared according to the modalities described in example 11. On the small molded bars, an Izod resilience of 9 kgcm/cm was determined.

EXAMPLE 20

A mix of 1,000 parts of polyethylene terephthalate according to example 11 and 200 parts of impact-modifier IV was prepared according to the modalities described in example 11. The Izod resilience of the small molded bars was 14.1 kgcm/cm.

EXAMPLE 21

A mix of 1,000 parts of polyethylene terephthalate according to example 11 and 200 parts of impact-modifier V was prepared according to the modalities described in example 11. On the small molded bars, an Izod resilience of 7 kgcm/cm was determined.

EXAMPLE 22

A mix of 1,000 parts of polyethylene terephthalate having an intrinsic viscosity of 1.12 nucleated with montan wax partly salified with Na ions, and 200 parts of impact-modifier IV was prepared according to the modalities described in example 11. On the small molded bars, an Izod resilience of 12,76 kgcm/cm was determined. The Izod resilience value of the same polyethylene terephthalate processed under the same conditions, but without addition of modifier was 3 kgcm/cm.

EXAMPLE 23

A mix of 1,000 parts of polybutene terephthalate and 200 parts of impact-modifier IV was prepared according to the modalities described in example 11.

The main molding conditions were as follows:

| | |
|---|---|
| Temperature of molten mass | 257°C |
| Speed of screw | 140 r.p.m. |
| Injection speed | 18 mm/sec. |
| Temperature of mold | 90°C |
| Cooling time | 25 sec. |
| Atmosphere of dry nitrogen | |

On the small molded bars, an Izod resilience of 15 kgcm/cm was determined. The Izod resilience value of polybutene terephthalate processed under the same conditions, but without an impact-modifier according to the invention was 4.9 kgcm/cm.

The intrinsic viscosity on the manufactured article was 1.08 dl/g.

We claim:

1. A process for producing an impact resistant polyester molding composition which comprises dispersing in a matrix of a linear polyester of an aromatic dicarboxylic acid or of a mixture of said aromatic acid with a small amount of an aliphatic dicarboxylic acid, and an aliphatic or cycloaliphatic saturated diol, said polyester having an intrinsic viscosity comprised between 0.65 dl/g and 1.5 dl/g, from 3–30% by weight on the weight of the composition of a polymeric material having a second order transition temperature lower than 0°C and selected from the group consisting of polybutadiene, butadiene-styrene copolymers, butadiene-acrylonitrile copolymers, ethylene-propylene rubbers, polyisobutene and polyisoprene and crosslinked for at least 30% by weight and grafted with monomers selected from the group consisting of acrylic esters of saturated aliphatic alcohols, methacrylic esters of saturated aliphatic alcohols, vinyl acetate, acrylonitrile, styrene and alkyl styrenes.

* * * * *